(12) United States Patent
Yuan et al.

(10) Patent No.: US 10,990,806 B2
(45) Date of Patent: Apr. 27, 2021

(54) FACIAL IMAGE PROCESSING METHOD, TERMINAL, AND DATA STORAGE MEDIUM

(71) Applicant: Tencent Technology (Shenzhen) Company Limited, Shenzhen (CN)

(72) Inventors: Lina Yuan, Shenzhen (CN); Jiwei Guo, Shenzhen (CN); Yifeng Li, Shenzhen (CN); Liang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 166 days.

(21) Appl. No.: 16/279,901

(22) Filed: Feb. 19, 2019

(65) Prior Publication Data

US 2019/0188454 A1    Jun. 20, 2019

Related U.S. Application Data

(63) Continuation of application No. PCT/CN2017/111810, filed on Nov. 20, 2017.

(30) Foreign Application Priority Data

Nov. 23, 2016    (CN) .......................... 201611046965.X

(51) Int. Cl.
*G06K 9/00* (2006.01)
*H04N 5/235* (2006.01)
(Continued)

(52) U.S. Cl.
CPC ..... *G06K 9/00255* (2013.01); *G06K 9/00268* (2013.01); *G06K 9/00288* (2013.01);
(Continued)

(58) Field of Classification Search
None
See application file for complete search history.

(56) References Cited

U.S. PATENT DOCUMENTS

| 8,606,011 B1* | 12/2013 | Ivanchenko | ............ H04W 4/50 382/176 |
| 8,996,072 B2* | 3/2015 | Li | ............................ G09G 5/10 455/566 |

(Continued)

FOREIGN PATENT DOCUMENTS

| CN | 104301598 A | 1/2015 |
| CN | 104320578 A | 1/2015 |

(Continued)

OTHER PUBLICATIONS

Tencent Technology, ISR, PCT/CN2017/111810, Jan. 31, 2018, 3 pg.

(Continued)

*Primary Examiner* — Andrae S Allison
(74) *Attorney, Agent, or Firm* — Morgan, Lewis & Bockius LLP

(57) ABSTRACT

The present disclosure provides technical solutions for improving facial image capturing, recognition, and authentication, including: collecting a face image in response to a facial scan instruction (e.g., for facial recognition) using a camera of a mobile terminal; calculating a measure of image brightness (e.g., a luminance value) of the collected face image; enhancing, when a value of the measure of image brightness of the collected face image is less than a first preset threshold, luminance of light that is emitted from a display of the mobile terminal to a target luminance value, and re-collecting a face image using the camera of the mobile terminal and calculating a corresponding value of the measure of image brightness for the re-collected face image; and performing, when the value of the measure of image brightness of the re-collected face image falls within a preset value range, facial recognition based on the re-collected face image.

17 Claims, 7 Drawing Sheets

(51) Int. Cl.
G06K 9/20 (2006.01)
G06K 9/03 (2006.01)

(52) U.S. Cl.
CPC ........... G06K 9/036 (2013.01); G06K 9/2027 (2013.01); H04N 5/235 (2013.01); H04N 5/2354 (2013.01)

(56) References Cited

U.S. PATENT DOCUMENTS

| | | | | |
|---|---|---|---|---|
| 10,720,126 | B2 * | 7/2020 | Bhat | G02F 1/163 |
| 2008/0122821 | A1 * | 5/2008 | Nilsson | H04M 1/22 |
| | | | | 345/207 |
| 2011/0012746 | A1 * | 1/2011 | Fish, Jr. | G08B 5/38 |
| | | | | 340/691.6 |
| 2014/0009639 | A1 | 1/2014 | Lee | |

FOREIGN PATENT DOCUMENTS

| | | | |
|---|---|---|---|
| CN | 104424467 | A | 3/2015 |
| CN | 105323382 | * | 2/2016 |
| CN | 105323382 | A | 2/2016 |
| CN | 105389572 | A * | 3/2016 |
| CN | 105389572 | A | 3/2016 |
| CN | 105744176 | A | 7/2016 |
| CN | 106056064 | A | 10/2016 |

OTHER PUBLICATIONS

Tencent Technology, Written Opinion, PCT/CN2017/111810, dated Jan. 31, 2018, 6 pg.
Tencent Technology, IPRP, PCT/CN2017/111810, May 28, 2019, 7 pg.

* cited by examiner

FACIAL IMAGE PROCESSING METHOD, TERMINAL, AND DATA STORAGE MEDIUM

CROSS REFERENCE TO RELATED APPLICATIONS

This application is a continuation of PCT Application PCT/CN2017/111810, filed Nov. 20, 2017, which claims priority to Chinese Patent Application No. 201611046965.X, filed on Nov. 23, 2016, all of which are incorporated herein by reference in their entirety.

FIELD OF THE TECHNOLOGY

The present disclosure relates to image technologies in the field of computers, and in particular, to a face image processing method and terminal, and a storage medium.

BACKGROUND OF THE DISCLOSURE

With rapid development of electronic technologies and the Internet, particularly the mobile Internet, functions of an electronic device, particularly an intelligent mobile device, become more powerful. A user may install various application programs on the electronic device based on requirements, to complete various transactions. For example, an application program installed on the electronic device is used to implement an image recognition process.

Currently, in the field of image recognition technologies, biometric recognition technologies such as fingerprint, face, and iris recognition technologies have been widely applied to many fields in the mobile life. In these biometric features, compared with face image recognition, fingerprint recognition and iris recognition have a higher requirement on hardware of an electronic device. Therefore, application of the face image recognition is relatively wider. For example, when a sensitive operation is performed on a security center of the electronic device, for example, changing a password, paying money, or changing a payment limit, the face image recognition needs to be performed to authenticate a user identity. It may be learned that a success rate of the face image recognition is directly related to usage experience of the user. However, there is still no effective solution in a related technology to improve the success rate of the face image recognition.

SUMMARY

In view of this, embodiments of the present technology are intended to provide a face image processing method and terminal, and a storage medium to resolve at least a problem that it is difficult to effectively improve a success rate of face image recognition in a related technology.

To resolve the foregoing technical problem, the technical solutions of the embodiments of the present technology are implemented as follows:

According to a first aspect, an embodiment of the present technology provides a face image processing method, including: at an electronic device having one or more processors, memory, a display, and a camera: collecting, using the camera, a face image in response to a facial scan instruction (e.g., as part of a facial recognition or authentication process); calculating a value of a measure of image brightness (e.g., an overall luminance value) of the collected face image; in accordance with a determination that the value of the measure of image brightness is less than a first preset threshold brightness (e.g., a preset minimum luminance value of an acceptable face image): enhancing luminance of light that is emitted from a display of the electronic device to a target luminance value (e.g., automatically increasing the overall screen brightness to the maximum brightness setting of the device without further user input); re-collecting a face image using the camera while the luminance of light emitted from the display of the electronic device is enhanced to the target luminance value (e.g., the display user interface will be overall brighter than before, illuminating the user's face, such that a brighter facial image is captured by the camera of the device); calculating a corresponding value for the measure of image brightness (e.g., an overall luminance value) for the re-collected face image; and in accordance with a determination that the value of the measure of image brightness (e.g., the overall luminance value) of the re-collected face image falls within a preset brightness range (e.g., the re-collected face image is of acceptable brightness), performing facial recognition based on the re-collected face image (e.g., and proceed with the rest of facial recognition and authentication steps).

In some embodiments, prior to enhancing the luminance of light emitted from the display of the electronic device to the target luminance value, the method includes obtaining hardware and/or software version information of the electronic device; and retrieving the first preset threshold brightness in accordance with the hardware and/or software version information of the electronic device. For example, the electronic device submits its make and model information to a server, and retrieves the maximum and minimum acceptable overall luminance values for an acceptable face image for the present facial recognition/authentication purpose. This is performed automatically by the device when the user starts the face scan operation, in accordance with some embodiments.

In some embodiments, the method further includes, in accordance with a determination that the value of the measure of image brightness of the collected face image is greater than a second preset threshold brightness: outputting prompt information to request a user to adjust an external image collection condition of the electronic device; and re-collecting a face image after the external image collection condition has been adjusted. For example, the device detects that the face image is too bright (e.g., the user is in the Sun), the device prompts the user to move into an area with less brightness, or less harsh lighting conditions. In some embodiments, the device automatically detects whether the user has moved the device to a different location based on detection of ambient lighting and movement of the device (e.g., change of device angle and orientation, etc.).

In some embodiments, the enhancing the luminance of light emitted from the display of the electronic device to the target luminance value comprises: determining highest luminance that is achievable by the display of the electronic device; and automatically adjusting luminance of the display of the electronic device to the highest luminance of the display.

In some embodiments, wherein the enhancing the luminance of light emitted from the display of the electronic device to the target luminance value comprises: determining, based on a difference between a brightness of an environment in which the electronic device is located and a required environment brightness, a luminance compensation value; and increasing luminance of the display of the electronic device in accordance with the luminance compensation value.

In some embodiments, the method includes: displaying, on the display of the electronic device, a user interface control (e.g., a button) for enhancing luminance of the display, wherein the user interface control visually indicates whether a luminance enhancement mode is currently turned on (e.g., lit up) or turned off (e.g., dim). In some embodiments, the method includes: while the luminance of the light emitted from the display of the electronic device is enhanced to the target luminance value (e.g., applied by the device in dependent of whether the user has turned on the enhanced lighting mode), detecting a user input that activates the user interface control to turn on the luminance enhancement mode; and in response to receiving the user input, adding a mask layer in a target area on a currently displayed user interface of the electronic device, wherein the target area comprises an area that is outside a facial portion of the face image currently shown on the display of the electronic device, and wherein an overall brightness of the mask layer is greater than an overall brightness of an area of the face image that is covered by the mask layer. For example, the mask is a bright white mask with a cut out hole in the middle that reveals the main portion of the face captured in the face image.

Other details of the method is disclosed in the specification and can be combined with the above features.

By using the technical solutions of the embodiments of the present technology, the luminance value of the collected face image is calculated; the luminance of the light emitted from the display of the terminal is enhanced to the target luminance value when the luminance value is less than the first preset threshold, and the face image is re-collected and the corresponding luminance value is calculated; and the facial recognition is automatically performed based on the re-collected face image, when the luminance value of the re-collected face image falls within the preset luminance value range. In this way, unqualified face image data sources can be reduced from a data source, thereby effectively improving the success rate of the face image recognition.

BRIEF DESCRIPTION OF THE DRAWINGS

To describe the technical solutions in the embodiments of the present technology or in the related technology more clearly, the following briefly describes the accompanying drawings required for describing the embodiments or the related technology. Apparently, the accompanying drawings in the following description show merely some embodiments of the present technology, and a person of ordinary skill in the art may still derive other drawings from these accompanying drawings without creative efforts.

DESCRIPTION OF EMBODIMENTS

The following clearly and completely describes the technical solutions in the embodiments of the present technology with reference to the accompanying drawings in the embodiments of the present technology. Obviously, the described embodiments are only some embodiments instead of all embodiments of the present technology. All other embodiments obtained by a person of ordinary skill in the art based on the embodiments of the present technology without creative effects shall fall within the protection scope of the present disclosure.

Before the embodiments of the present technology are further described in detail, nouns and terms related to the embodiments of the present technology are described, and the nouns and the terms related to the embodiments of the present technology are appropriate for the following explanations.

(1) An RGB color space model is a color space model formed by mixing light of three colors: red, green and blue, based on different ratios. A color space describes a color set in the form of mathematics such as a coordinate space in geometry. A value range of each color component is [0,255]. Image data collected by a camera of an electronic device using an IOS operating system, for example, an iPhone, is in an RGB format by default.

(2) A YUV color space model is a color space model formed by mixing luminance and chrominance based on different ratios. Y represents the luminance (or luma), that is, a grayscale value; and U and V represents the chrominance (or chroma) and are used for describing a color and saturation of an image. Image data collected by a camera of an electronic device using an Android operating system is in a YUV format by default.

A feature of a YUV color space is that a luminance signal Y and chrominance signals U and V are separate. If there is only a Y signal component and there are no U and V signal components, a represented image is a black-and-white grayscale image. A color television uses the YUV color space model to resolve a compatibility problem between the color television and a black-and-white television by using the luminance signal Y, so that the black-and-white television can also receive a color television signal.

Compared with that degrees of importance of three colors are the same in the RGB color space model, the YUV color space model can greatly compress color components, thereby reducing storage space as much as possible. Therefore, the YUV color space model is extensively applied to network transmission.

Figure 1:
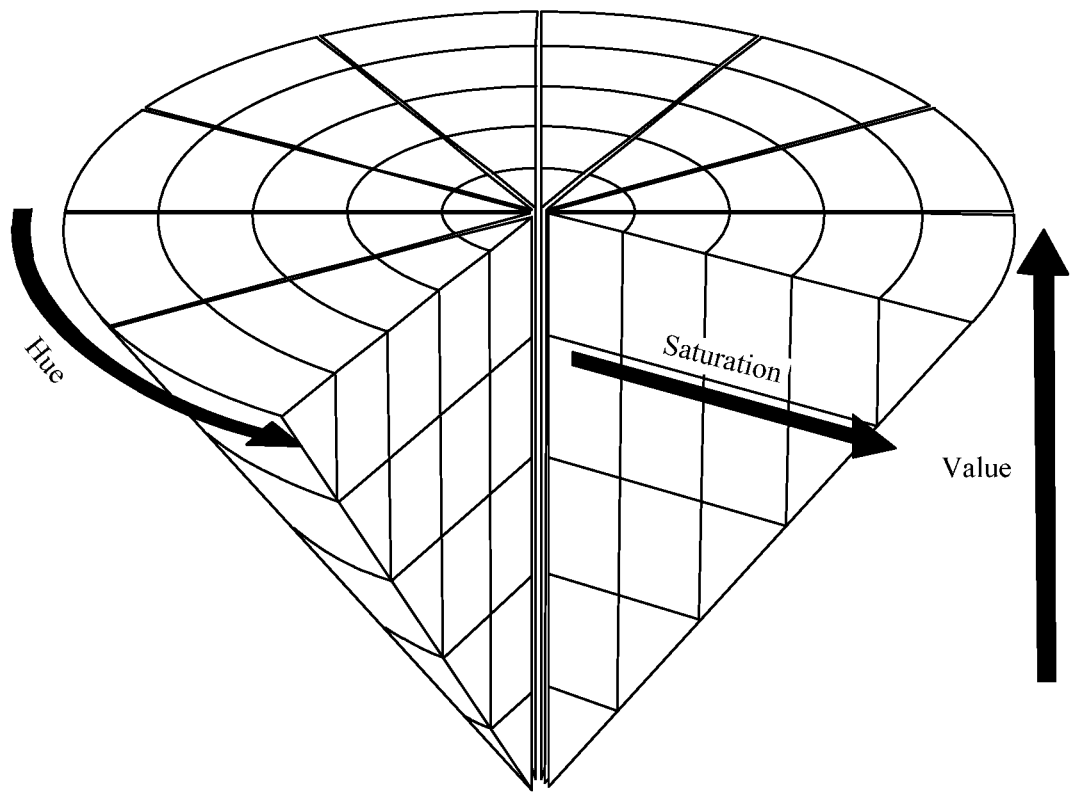
FIG. 1 is a schematic diagram of an HSV color space model according to an embodiment of the present technology.

(3) An HSV color space model is a color space model formed by combining hue, saturation, and value, and is also referred to as a hexcone model. The model has an advantage of an intuitive feature of a color, is easy to be observed, and is relatively widely applied. Referring to FIG. 1, FIG. 1 is a schematic diagram of an HSV color space model according to an embodiment of the present technology. Parameter components that represent a color in the HSV color space model are hue (H), saturation (S), and value (V).

The component H represents a hue of the color, a value range is [0,360), and a value is an integer type. The component H is measured by using an angle. Calculation is performed from red in a counterclockwise direction, red is 0°, green is 120°, and blue is 240°.

The component S represents purity of the color, that is, an extent to which the color approaches a spectrum color, a value range is [0,1), and a value is a floating-point number type. A larger proportion of the spectrum color indicates a greater extent to which the color approaches the spectrum color and higher saturation.

Figure 2:
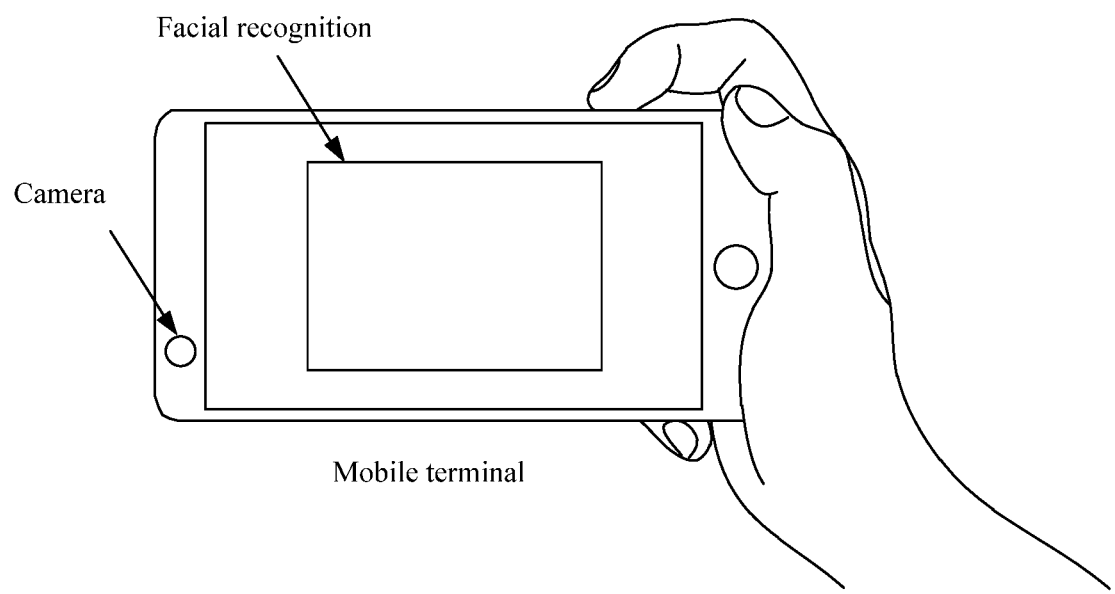
FIG. 2 is a schematic diagram of an optional application scenario of a face image processing method according to an embodiment of the present technology.

The component V represents an extent of brightness of the color, a value range is [0,1), and a value is a floating-point number type. For a light source color, V is related to lightness of an illuminant; and for an object color, V is related to transmittance or reflectance of an object. To better understand the technical solutions of a face image processing method and terminal provided in the embodiments of the present technology, the following describes an application scenario to which the embodiments of the present technology are applicable. Referring to FIG. 2, FIG. 2 is a schematic diagram of an optional application scenario of a face image processing method according to an embodiment of the present technology. In FIG. 2, in a process in which a user performs various operations by using a mobile terminal, when facial recognition needs to be performed, for example, when a password needs to be set and a payment transaction needs to be performed during running of an application program, the mobile terminal turns on a photographing module such as a camera to collect a face image of the user, and performs recognition and verification on the collected face image. If the verification succeeds, subsequent operations such as setting the password and performing the payment transaction may be continued; and if the verification fails, the user is informed that the verification fails and the subsequent operations cannot be performed.

In this embodiment of the present technology, the mobile terminal may include, but is not limited to, an electronic device that has a photographing module or that may be connected to a photographing module to collect a face image, for example, a mobile telephone, a mobile computer, a tablet computer, a personal digital assistant (PDA), a media player, a smart TV, a smartwatch, smart glasses, or a smart band.

Figure 3:
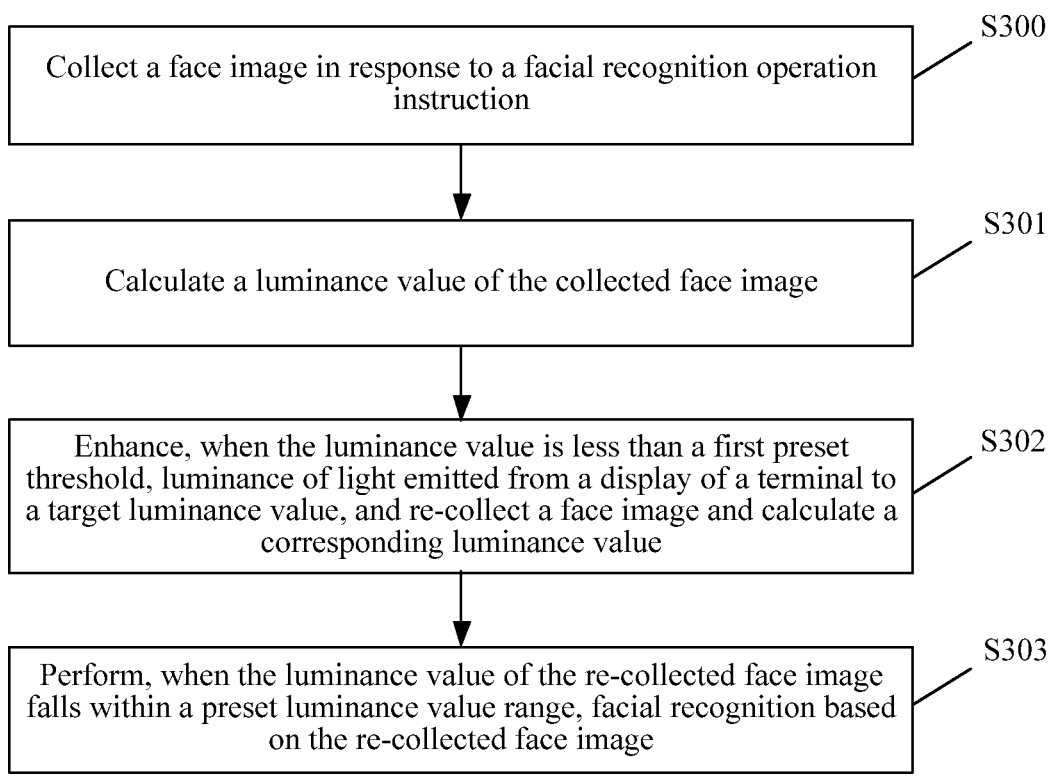
FIG. 3 is a schematic diagram of an optional procedure of a face image processing method according to an embodiment of the present technology.

Based on the schematic diagram of the optional application scenario shown in FIG. 2, referring to FIG. 3, FIG. 3 is a schematic diagram of an optional procedure of a face image processing method according to an embodiment of the present technology. The face image processing method may be applied to the foregoing various mobile terminals. This is not limited in this embodiment of the present technology herein. As shown in FIG. 3, an implementation process of the face image processing method in this embodiment of the present technology may include the following steps:

Step S300: Collect a face image in response to a facial recognition operation instruction.

In an embodiment, in a process in which various operations are performed on a mobile terminal, when facial recognition needs to be performed, that is, when the facial recognition operation instruction generated by a system or input by a user is received, a photographing module of the mobile terminal may be turned on to collect the face image. The photographing module may include a camera of the mobile terminal, or a camera of an electronic device connected to the mobile terminal.

It should be noted that the facial recognition operation instruction in this embodiment of the present technology may be triggered to be generated when the user performs a sensitive operation on a security center of the mobile terminal, for example, changes a password, pays money, or changes a payment limit. The mobile terminal in this embodiment of the present technology may also be referred to as a terminal for short.

Step S301: Calculate a luminance value of the collected face image.

In an optional embodiment of the present technology, the calculating a luminance value of the collected face image may be implemented in the following manner: converting, based on a color space model used by the terminal, the collected face image into a color space model that is based on hue, saturation, and value, and extracting a corresponding luminance value from a value channel of the converted face image.

For example, if a type of an operating system of the terminal is an Android system, collected image data is in a YUV format by default. In this case, a YUV color space model corresponding to the collected face image is first converted into an RGB color space model, then the RGB color space model is converted into an HSV color space model, and finally the corresponding luminance value is extracted from the value channel of the converted face image. If the type of the operating system of the terminal is an IOS system, the collected image data is in an RGB format by default. In this case, the RGB color space model corresponding to the collected face image is directly converted into the HSV color space model, and finally the corresponding luminance value is extracted from the value channel of the converted face image.

Step S302: Enhance, when the luminance value is less than a first preset threshold, luminance of light emitted from a display of a terminal to a target luminance value, and re-collect a face image and calculate a corresponding luminance value.

In an optional embodiment of the present technology, the enhancing luminance of light emitted from a display of a terminal to a target luminance value may be implemented in the following manners:

Manner (1): determining highest luminance that can be achieved by the display of the terminal as the target luminance value, and adjusting the luminance of the display of the terminal to the highest luminance.

For the foregoing manner (1), resolution of displays of different terminals may be different, and luminance that can be achieved by the displays of the different terminals is different. Therefore, the highest luminance that can be achieved by the display of the terminal serves as the target luminance value, and the luminance of the display of the terminal is enhanced at a time based on the highest luminance. That is, the luminance of the display of the terminal is adjusted to the highest luminance. In this way, the luminance of the display of the terminal does not need to be repeatedly adjusted, and efficiency of face image recognition is improved.

Manner (2): determining, based on a difference between light luminance of an environment in which the terminal is located and required environment light luminance, a luminance compensation value as the target luminance value, and adjusting the luminance of the display of the terminal to the luminance compensation value.

For the foregoing manner (2), the luminance of the display of the terminal may be enhanced based on the light luminance of the environment in which the terminal is currently located and ideal luminance of the face image recognition, that is, the required environment light luminance. Herein, a difference may be obtained by a value of the required environment light luminance minus a value of the light luminance of the environment in which the terminal is currently located, and the obtained difference may be equivalent to the luminance compensation value. In this way, the collected face image satisfies the ideal luminance of the recognition (the required environment light luminance), and accuracy of a recognition result based on the collected face image is ensured.

In addition, a product of the obtained difference and a compensation coefficient greater than 1 may serve as the luminance compensation value, and the luminance of the display of the terminal is gradually adjusted based on the luminance compensation value to adjust the luminance of the display of the terminal to the luminance compensation value. In this way, the negative impact of scattering of light on compensated light luminance can be effectively avoided.

It may be understood that in addition to enhancing the luminance of the light emitted from the display of the terminal in the manners (1) and (2), the target luminance value may be first determined based on an empirical value, and then the luminance of the light emitted from the display of the terminal is enhanced to the target luminance value determined based on the empirical value.

In an optional embodiment of the present technology, before the enhancing luminance of light emitted from a display of a terminal to a target luminance value, the face image processing method further includes: displaying, on the display of the terminal, a button for enhancing luminance, the button being used for prompting whether a luminance enhancement mode is already turned on; and adding a mask layer in a target area in a display interface of the terminal after the luminance of the light emitted from the display of the terminal is enhanced to the target luminance value in response to a selection instruction for the button, the target area including an area that does not display the face image and that is in the display of the terminal.

Herein, the mask layer added in the target area in the display interface of the terminal may be a white non-transparent mask layer, and certainly may alternatively be another type of mask layer. This is not limited in this embodiment of the present technology herein. In this way, by disposing the mask layer in the target area, a success rate of face image recognition in a completely dark environment can be effectively improved, so that usage scenarios of the face image recognition are wider.

In an optional embodiment of the present technology, the first preset threshold may be obtained in the following manner: obtaining hardware and/or software version information of the terminal; and obtaining the first preset threshold matching the hardware and/or software version information of the terminal. It may be learned that in this manner, the first preset threshold is directly obtained by the terminal. It may be understood that in another optional embodiment, the first preset threshold may be obtained by a server. That is, the terminal sends the hardware and/or software version information of the terminal to the server, the corresponding first preset threshold is allocated by the server based on the hardware and/or software version information of the terminal, and the allocated first preset threshold is returned by the server to the terminal.

The hardware version information of the terminal may include, but is not limited to, hard information such as a type, a brand, a mainboard or a display recognition chip of the terminal; and the software version information of the terminal may include, but is not limited to, software information such as an operating system version, an application program that currently requests to perform face image recognition, or version information of the application program.

In an embodiment, the determining that the luminance value of the collected face image is less than the first preset threshold may be implemented by directly comparing the luminance value of the face image with the first preset threshold, or may be implemented by determining a preset luminance value range that the luminance value of the collected face image falls within. It may be understood that the first preset threshold may be a minimum value of a luminance value range a, when a luminance value range b that the luminance value of the collected face image falls within is less than the luminance value range a, it may be determined that the luminance value of the collected face image is less than the first preset threshold.

When it is determined that the luminance value of the collected face image is less than the first preset threshold, it may be learned that an environment in which the face image recognition is currently performed is relatively dark. In this case, the luminance of the light emitted from the display of the terminal needs to be enhanced to the target luminance value, to enhance luminance of light irradiated on the face of the user, and then a clearer face image can be collected when a face image is re-collected, thereby more accurately extracting a facial feature of the face.

In an optional embodiment of the present technology, the face image processing method further includes: outputting prompt information when the luminance value of the collected face image is greater than a second preset threshold, the prompt information being used for prompting to adjust a collection angle and/or area; and re-collecting a face image and calculating a luminance value of the re-collected face image. In this way, when the luminance value of the collected face image is greater than the second preset threshold, the prompt information indicating that light is excessively bright is generated and displayed, so that when ambient light is non-ideal, the prompt information can actively guide the user to perform a correct operation (for example, adjusting the collection angle and/or area). By actively reminding the user of a reason for a failure of face image verification, usage experience of the user is greatly improved.

In an optional embodiment of the present technology, the second preset threshold may be obtained in the following manner: obtaining hardware and/or software version information of the terminal; and obtaining the second preset threshold matching the hardware and/or software version information of the terminal. It may be learned that in this manner, the second preset threshold is directly obtained by the terminal. Certainly, in another optional embodiment, the second preset threshold may be obtained by a server. That is, the terminal sends the hardware and/or software version information of the terminal to the server, the corresponding second preset threshold is allocated by the server based on the hardware and/or software version information of the terminal, and the allocated second preset threshold is returned by the server to the terminal.

Step S303: Perform, when the luminance value of the re-collected face image falls within a preset luminance value range, facial recognition based on the re-collected face image.

In an embodiment, that the luminance value of the re-collected face image falls within a preset luminance value range may include: determining that the luminance value of the re-collected face image is greater than or equal to the first preset threshold and less than the second preset threshold, and indicating that light luminance of an environment in which the terminal is currently located is suitable for performing facial recognition, so that the user may learn that the light luminance of the environment in which the terminal is currently located is not excessively dark or excessively bright, and a problem that excessively dark or excessively bright light luminance reduces accuracy of face image recognition is avoided.

By using the technical solutions of this embodiment of the present technology, the luminance value of the collected face image is calculated in response to the facial recognition operation instruction; the luminance of the light emitted from the display of the terminal is enhanced to the target luminance value when the luminance value is less than the first preset threshold, and the face image is re-collected and the corresponding luminance value is calculated; and the facial recognition is automatically performed based on the re-collected face image, when the luminance value of the re-collected face image falls within the preset luminance value range. In this way, unqualified face image data sources can be reduced from a data source, thereby effectively improving the success rate of the face image recognition.

The following further describes a specific implementation process of the face image processing method in the embodiments of the present technology in detail by using a specific embodiment.

Figure 4:
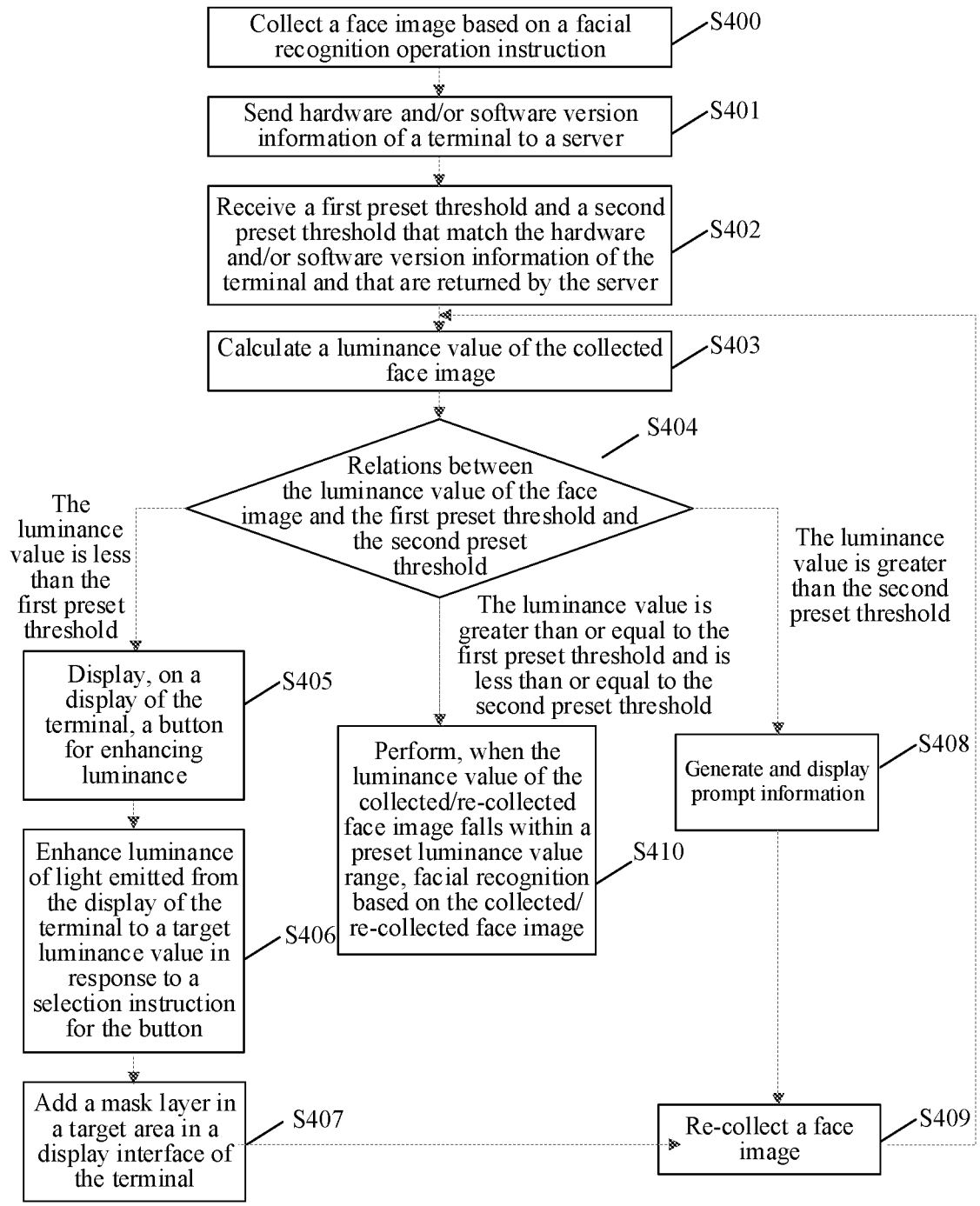
FIG. 4 is another schematic diagram of an optional procedure of a face image processing method according to an embodiment of the present technology.

Referring to FIG. 4, FIG. 4 is another schematic diagram of an optional procedure of a face image processing method according to an embodiment of the present technology. The face image processing method may be applied to the foregoing various mobile terminals. This is not limited in this embodiment of the present technology herein. As shown in FIG. 4, a specific implementation process of the face image processing method in this embodiment of the present technology may include the following steps:

Step S400: Collect a face image based on a facial recognition operation instruction.

In an embodiment, in a process in which various operations are performed on a mobile terminal, when facial recognition needs to be performed, that is, when the facial recognition operation instruction generated by a system or input by a user is received, a photographing module of the mobile terminal may be turned on to collect the face image. The photographing module may include a camera of the mobile terminal, or a camera of an electronic device connected to the mobile terminal.

It should be noted that the facial recognition operation instruction in this embodiment of the present technology may be triggered to be generated when the user performs a sensitive operation on a security center of the mobile terminal, for example, changes a password, pays money, or changes a payment limit. The mobile terminal in this embodiment of the present technology may also be referred to as a terminal for short.

Step S401: Send hardware and/or software version information of a terminal to a server.

In an embodiment, the terminal may send the hardware and/or software version information of the terminal to the server while turning on the photographing module to collect the face image. In another embodiment, the terminal may periodically send the hardware and/or software version information of the terminal to the server before collecting the face image. For example, the terminal sends the hardware and/or software version information of the terminal based on frequency in which a period is one day or two days. This is not limited in this embodiment of the present technology herein. The hardware version information of the terminal may include, but is not limited to, hard information such as a type, a brand, a mainboard or a display recognition chip of the terminal; and the software version information of the terminal may include, but is not limited to, software information such as an operating system version, an application program that currently requests to perform face image recognition, or version information of the application program.

It may be understood that the terminal may send the hardware and/or software version information of the terminal from a background to the corresponding server by using the application program that currently requests to perform the face image recognition, to obtain a matched light threshold.

Step S402: Receive a first preset threshold and a second preset threshold that match the hardware and/or software version information of the terminal and that are returned by the server.

In an embodiment, after the server receives the hardware and/or software version information of the terminal, the server may search a database for matched light thresholds used for performing face image recognition, and the light thresholds may include the first preset threshold and the second preset threshold. The first preset threshold is less than the second preset threshold. The server returns the found first preset threshold and second preset threshold to the terminal. That is, the terminal receives the first preset threshold and the second preset threshold.

In addition to obtaining the first preset threshold and the second preset threshold by using the method of the foregoing step S401 and step S402, in an optional embodiment of the present technology, the first preset threshold or the second preset threshold may be obtained in the following manner: obtaining hardware and/or software version information of a terminal; and obtaining a first preset threshold and/or a second preset threshold matching the hardware and/or software version information of the terminal. It may be learned that in this manner, the first preset threshold and/or the second preset threshold is directly obtained by the terminal.

Step S403: Calculate a luminance value of the collected face image.

In an optional embodiment of the present technology, the calculating a luminance value of the collected face image may be implemented in the following manner: converting, based on a color space model used by the terminal, the collected face image into a color space model that is based on hue, saturation, and value, and extracting a corresponding luminance value from a value channel of the converted face image.

For example, if a type of an operating system of the terminal is an Android system, collected image data is in a YUV format by default. In this case, a YUV color space model corresponding to the collected face image is first converted into an RGB color space model, then the RGB color space model is converted into an HSV color space model, and finally the corresponding luminance value is extracted from the value channel of the converted face image. If the type of the operating system of the terminal is an IOS system, the collected image data is in an RGB format by default. In this case, the RGB color space model corresponding to the collected face image is directly converted into the HSV color space model, and finally the corresponding luminance value is extracted from the value channel of the converted face image.

In this embodiment of the present technology, if an operating system of the terminal determines the collected image data is in the RGB format by default, an algorithm transformRGB2HSV for converting the RGB color space model into the HSV color space model may be defined as follows:

MAX is set to a maximum value of three components R, G, and B, and MIN is set to a minimum value of the three components.

If MAX=MIN,

H=0,

S=0, and V=MAX/255.

If MAX≠MIN, when G≥B, $H=(MAX-R'+G'-MIN+B'-MIN)/(MAX-MIN) \times 60,$

S=1−MIN/MAX, and

V=MAX/255; and when G<B, $H=360-(MAX-R'+G'-MIN+B'-MIN)/(MAX-MIN) \times 60,$

S=1−MIN/MAX, and

V=MAX/255.

If the operating system of the terminal determines the collected image data is in the YUV format by default, an algorithm transformYUV2RGB for converting the YUV color space model into the RGB color space model may be defined as follows:

$R=Y+1.14V,$ $G=Y-0.39U-0.58V,$ and $B=Y+2.03U.$

Then, the luminance value of the collected face image is calculated by using the algorithm transformRGB2HSV for converting the RGB color space model into the HSV color space model.

It should be noted that when the collected face image is the YUV format, a Y component may alternatively directly serve as the luminance value of the face image. The foregoing conversion algorithms between the color space models are only an optional embodiment of the present technology, and this embodiment of the present technology does not limit how to convert between the color space models.

Step S404: Determine relations between the luminance value of the face image and the first preset threshold and the second preset threshold, and perform step S405 if the luminance value is less than the first preset threshold; perform step S408 if the luminance value is greater than the second preset threshold; otherwise, perform step S410.

Step S405: Display, on a display of the terminal, a button for enhancing luminance.

Herein, the button is used for prompting whether a luminance enhancement mode is already turned on, and if the luminance enhancement mode is already turned on, perform step S406; otherwise, perform step S409.

Step S406: Enhance luminance of light emitted from the display of the terminal to a target luminance value in response to a selection instruction for the button.

Figure 5:
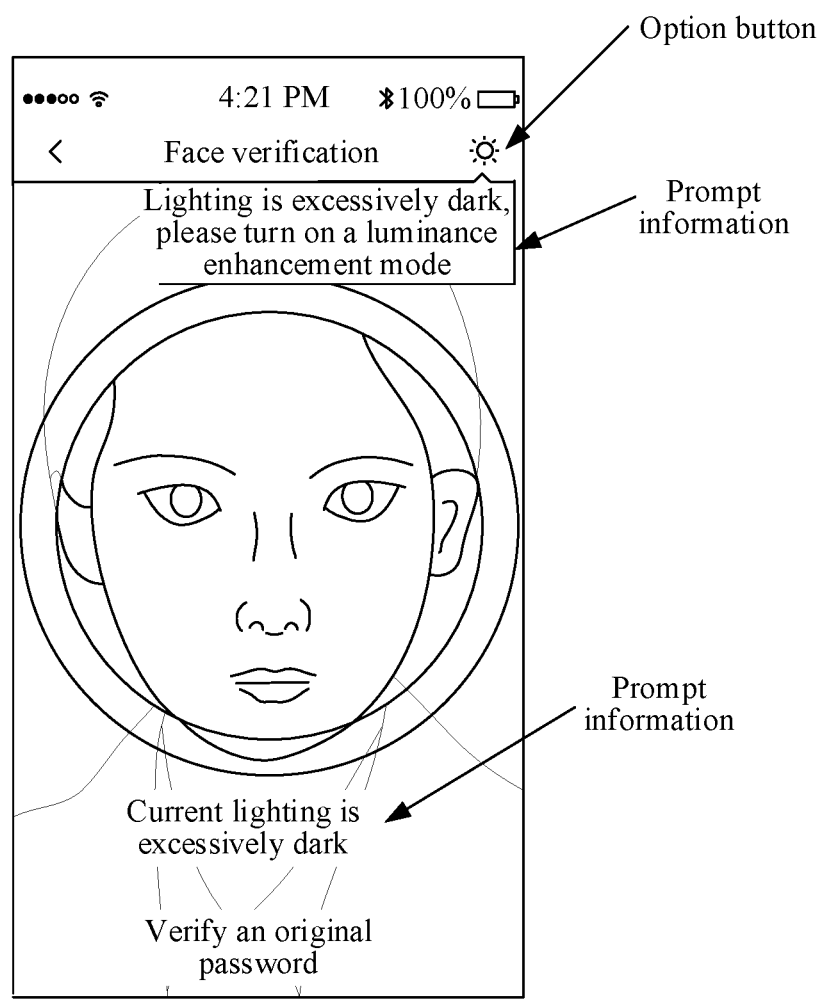
FIG. 5 is a schematic diagram of an optional interface for turning on a luminance enhancement mode according to an embodiment of the present technology.

Referring to FIG. 5, FIG. 5 is a schematic diagram of an optional interface for turning on a luminance enhancement mode according to an embodiment of the present technology. In FIG. 5, when the terminal determines that the luminance value of the collected face image is less than the first preset threshold, the terminal learns that light luminance of an environment in which the terminal is currently located is excessively dark. In this case, prompt information such as "Current light is excessively dark" or "Light is excessively dark, please turn on the luminance enhancement mode" may be displayed in an interface of the terminal to inform the user that the light luminance of the environment in which the terminal is currently located is excessively dark. In addition, the option button for enhancing luminance is displayed on a display of the terminal, and the option button is used for prompting whether the luminance enhancement mode is already turned on. If the user clicks on the option button, it indicates that the user inputs the selection instruction for the option button and the luminance enhancement mode may be turned on.

In an optional embodiment of the present technology, the enhancing luminance of light emitted from a display of a terminal to a target luminance value may be implemented in the following manners:

Manner (1): determining highest luminance that can be achieved by the display of the terminal as the target luminance value, and adjusting the luminance of the display of the terminal to the highest luminance.

For the foregoing manner (1), resolution of displays of different terminals may be different, and luminance that can be achieved by the displays of the different terminals is different. Therefore, the highest luminance that can be achieved by the display of the terminal serves as the target luminance value, and the luminance of the display of the terminal is enhanced at a time based on the highest luminance. That is, the luminance of the display of the terminal is adjusted to the highest luminance. In this way, the luminance of the display of the terminal does not need to be repeatedly adjusted, and efficiency of face image recognition is improved.

Manner (2): determining, based on a difference between light luminance of an environment in which the terminal is located and required environment light luminance, a luminance compensation value as the target luminance value, and adjusting the luminance of the display of the terminal to the luminance compensation value.

For the foregoing manner (2), the luminance of the display of the terminal may be enhanced based on the light luminance of the environment in which the terminal is currently located and ideal luminance of the face image recognition, that is, the required environment light luminance. Herein, a difference may be obtained by a value of the required environment light luminance minus a value of the light luminance of the environment in which the terminal is currently located, and the obtained difference may be equivalent to the luminance compensation value. In this way, the collected face image satisfies the ideal luminance of the recognition (the required environment light luminance), and accuracy of a recognition result based on the collected face image is ensured.

In addition, a product of the obtained difference and a compensation coefficient greater than 1 may serve as the luminance compensation value, and the luminance of the display of the terminal is gradually adjusted based on the luminance compensation value to adjust the luminance of the display of the terminal to the luminance compensation value. In this way, the negative impact of scattering of light on compensated light luminance can be effectively avoided.

It may be understood that in addition to enhancing the luminance of the light emitted from the display of the terminal in the manners (1) and (2), the target luminance value may be first determined based on an empirical value, and then the luminance of the light emitted from the display of the terminal is enhanced to the target luminance value determined based on the empirical value.

Step S407: Add a mask layer in a target area in a display interface of the terminal, and then perform step S409.

Figure 6:
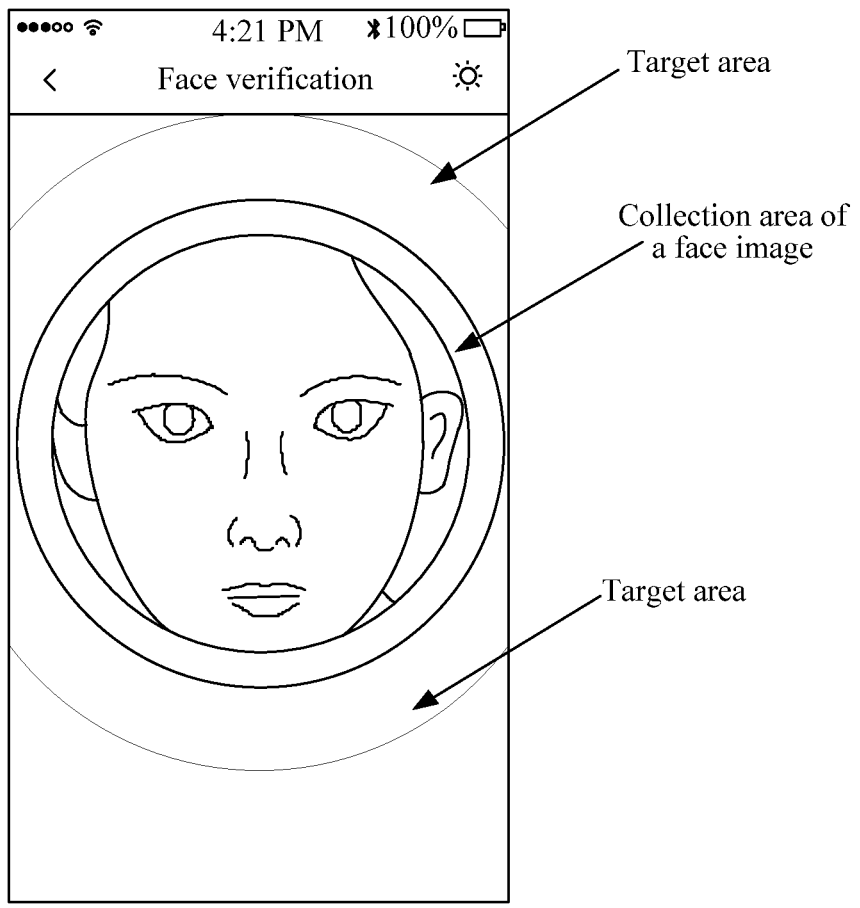
FIG. 6 is a schematic diagram of an optional interface for adding a mask layer in a target area in a display interface of a terminal according to an embodiment of the present technology.

Referring to FIG. 6, FIG. 6 is a schematic diagram of an optional interface for adding a mask layer in a target area in a display interface of a terminal according to an embodiment of the present technology. In FIG. 6, the target area includes an area that does not display the face image and that is in the display of the terminal. In other words, the target area includes all areas other than a collection area of the face image in a current display interface of the terminal, and certainly the target area may not include an area such as a navigation menu bar, an uppermost running status bar or a pull-down menu bar. The mask layer added in the target area in the display interface of the terminal may be a white non-transparent mask layer, and certainly may alternatively be another type of mask layer. This is not limited in this embodiment of the present technology herein. In this way, by adding the mask layer in the target area, more white light may be emitted from the display of the terminal to light up the face of the user, and a success rate of face image recognition in a completely dark environment can be effectively improved, so that usage scenarios of face image recognition are wider.

When it is determined that the luminance value of the collected face image is less than the first preset threshold, it may be learned that an environment in which the face image recognition is currently performed is relatively dark. In this case, the luminance of the light emitted from the display of the terminal needs to be enhanced to the target luminance value, to enhance luminance of light irradiated on the face of the user, and then a clearer face image can be collected when a face image is re-collected, thereby more accurately extracting a facial feature of the face.

Step S408: Generate and display prompt information.

Herein, the prompt information is used for prompting to adjust a collection angle and/or area.

In an embodiment, when the terminal determines that the luminance value of the collected face image is greater than the second preset threshold, the terminal learns that the light luminance of the environment in which the terminal is currently located is excessively bright. Excessively bright light luminance also affects the luminance value of the face image collected by the photographing module. In this way, when the luminance value of the collected face image is greater than the second preset threshold, the terminal generates and displays prompt information indicating that light is excessively bright, for example, "Light is excessively bright, please adjust to a suitable position" or "Light is excessively bright, please adjust to a suitable angle", so that when ambient light is non-ideal, the prompt information can actively guide the user to perform a correct operation. By actively reminding the user of a reason for a failure of face image verification, usage experience of the user is greatly improved.

Step S409: Re-collect a face image, and return to step S403.

Step S410: Perform, when the luminance value of the collected/re-collected face image falls within a preset luminance value range, facial recognition based on the collected/re-collected face image.

In an embodiment, that the luminance value of the collected/re-collected face image falls within the preset luminance value range may include: determining that the luminance value of the collected/re-collected face image is greater than or equal to the first preset threshold and less than the second preset threshold, and indicating that light luminance of an environment in which the terminal is currently located is suitable for performing facial recognition, so that the user may learn that the light luminance of the environment in which the terminal is currently located is not excessively dark or excessively bright, and a problem that excessively dark or excessively bright light luminance reduces accuracy of face image recognition is avoided.

By using the technical solutions of the embodiments of the present technology, the luminance value of the collected face image is calculated; the luminance of the light emitted from the display of the terminal is enhanced to the target luminance value when the luminance value is less than the first preset threshold, and the face image is re-collected and the corresponding luminance value is calculated; and the facial recognition is automatically performed based on the re-collected face image, when the luminance value of the re-collected face image falls within the preset luminance value range, thereby reducing unqualified face image data sources from a data source and improving the success rate of the facial recognition. In addition, when the luminance value of the face image is greater than the second preset threshold, the prompt information indicating that the light is excessively bright is generated and displayed, so that when ambient light is non-ideal, the prompt information can guide the user to perform the correct operation (for example, adjusting the collection angle and/or area). By actively reminding the user of the reason for the failure of the face image verification, the usage experience of the user is greatly improved. In addition, when light is seriously insufficient, the button for enhancing the luminance is generated and displayed to prompt whether the luminance enhancement mode is already turned on, and the mask layer is added in the target area in the display interface of the terminal after the luminance enhancement mode is turned on. Therefore, the success rate of the face image recognition in the completely dark environment can be effectively improved, so that the usage scenarios of the face image recognition are wider.

Figure 7:
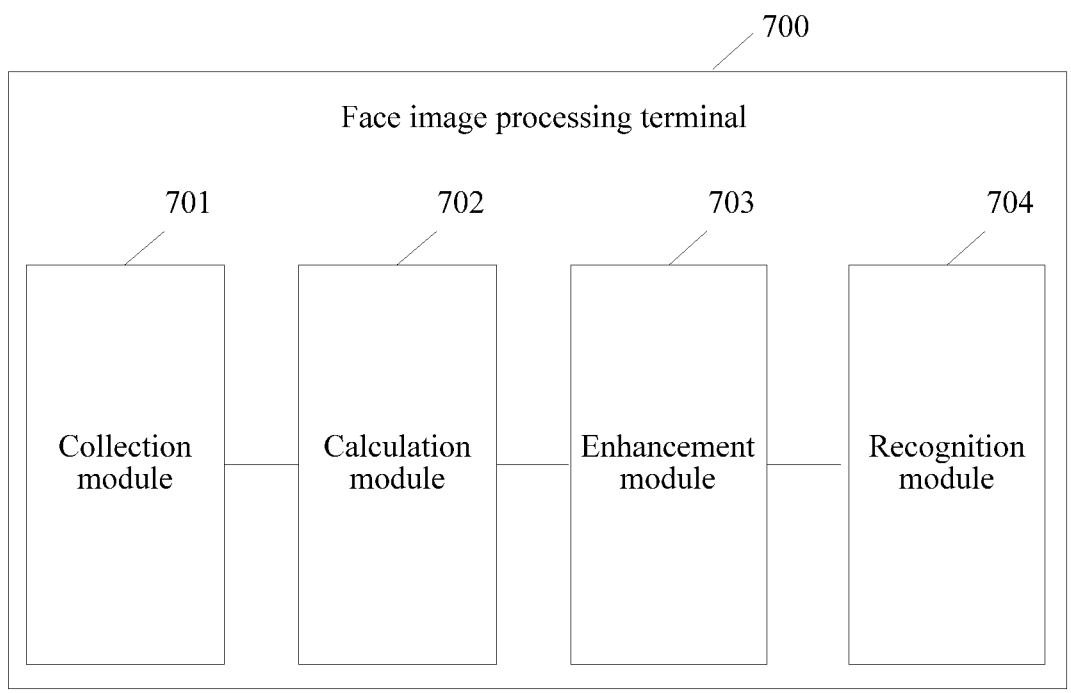
FIG. 7 is a schematic diagram of an optional function structure of a face image processing terminal according to an embodiment of the present technology.

To facilitate better implementation of the face image processing method provided in the embodiments of the present technology, an embodiment of the present technology further provides a face image processing terminal. The following describes the face image processing terminal in detail with reference to the accompanying drawings. Referring to FIG. 7, FIG. 7 is a schematic diagram of an optional function structure of a face image processing terminal according to an embodiment of the present technology. A face image processing terminal 700 includes a collection module 701, a calculation module 702, an enhancement module 703, and a recognition module 704. The following describes functions of the modules.

The collection module 701 is configured to collect a face image in response to a facial recognition operation instruction;

the calculation module 702 is configured to calculate a luminance value of the collected face image;

the enhancement module 703 is configured to: enhance, when the luminance value is less than a first preset threshold, luminance of light emitted from a display of the terminal to a target luminance value, and re-collect a face image and calculate a corresponding luminance value; and the recognition module 704 is configured to perform, when the luminance value of the re-collected face image falls within a preset luminance value range, facial recognition based on the re-collected face image.

For calculating, by the calculation module 702, a luminance value of the collected face image, the calculation module 702 is specifically configured to: convert, based on a color space model used by the terminal, the collected face image into a color space model that is based on hue, saturation, and value, and extract a corresponding luminance value from a value channel of the converted face image.

For example, if a type of an operating system of the terminal is an Android system, collected image data is in a YUV format by default. In this case, a YUV color space model corresponding to the collected face image is first converted into an RGB color space model, then the RGB color space model is converted into an HSV color space model, and finally the corresponding luminance value is extracted from the value channel of the converted face image. If the type of the operating system of the terminal is an IOS system, the collected image data is in an RGB format by default. In this case, the RGB color space model corresponding to the collected face image is directly converted into the HSV color space model, and finally the corresponding luminance value is extracted from the value channel of the converted face image.

For enhancing, by the enhancement module 703, luminance of light emitted from a display of the terminal to a target luminance value, the enhancement module 703 is specifically configured to: determine highest luminance that can be achieved by the display of the terminal as the target luminance value, and adjust luminance of the display of the terminal to the highest luminance; or determine, based on a difference between light luminance of an environment in which the terminal is located and required environment light luminance, a luminance compensation value as the target luminance value, and adjust luminance of the display of the terminal to the luminance compensation value.

Figure 8:
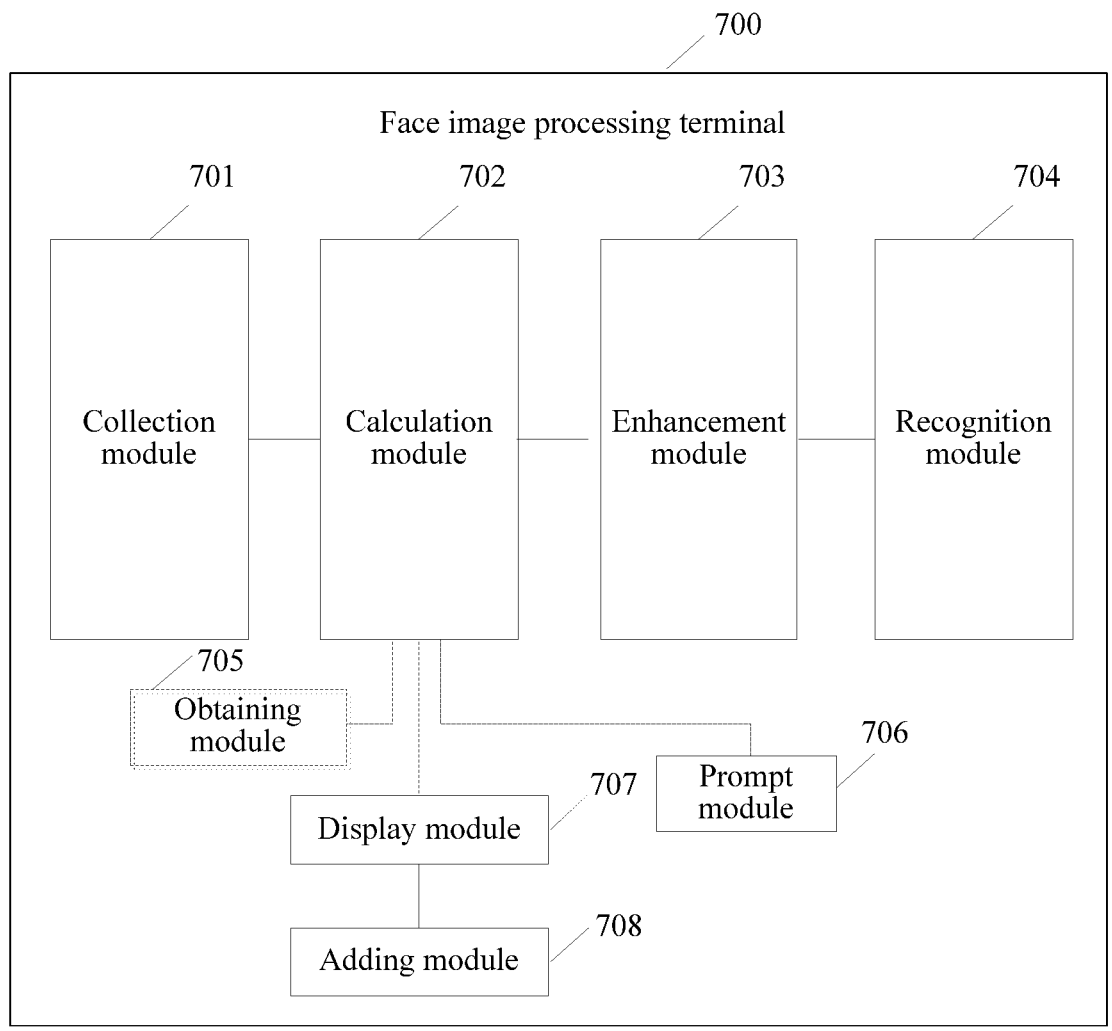
FIG. 8 is another schematic diagram of an optional function structure of a face image processing terminal according to an embodiment of the present technology.

Referring to FIG. 8, FIG. 8 is another schematic diagram of an optional function structure of a face image processing terminal according to an embodiment of the present technology. In addition to the collection module 701, the calculation module 702, the enhancement module 703, and the recognition module 704, the face image processing terminal 700 may further include an obtaining module 705, configured to obtain hardware and/or software version information of the terminal. The obtaining module 705 is further configured to obtain the first preset threshold matching the hardware and/or software version information of the terminal.

The face image processing terminal 700 may further include a prompt module 706, configured to: output prompt information when the luminance value of the collected face image is greater than a second preset threshold, the prompt information being used for prompting to adjust a collection angle and/or area; and re-collect a face image and calculate a luminance value of the re-collected face image.

Herein, the obtaining module 705 in the face image processing terminal 700 is further configured to obtain hardware and/or software version information of the terminal.

The obtaining module 705 is further configured to obtain the second preset threshold matching the hardware and/or software version information of the terminal.

Herein, the face image processing terminal 700 may further include a display module 707, configured to display, on the display of the terminal before the enhancement module 703 enhances the luminance of the light emitted from the display of the terminal to the target luminance value, a button for enhancing luminance, the button being used for prompting whether a luminance enhancement mode is already turned on.

The face image processing terminal 700 may further include an adding module 708, configured to add a mask layer in a target area in a display interface of the terminal after the luminance of the light emitted from the display of the terminal is enhanced to the target luminance value in response to a selection instruction for the button.

The target area includes an area that does not display the face image and that is in the display of the terminal. In other words, the target area includes all areas other than a collection area of the face image in a current display interface of the terminal. The mask layer added in the target area in the display interface of the terminal may be a white non-transparent mask layer, and certainly may alternatively be another type of mask layer. This is not limited in this embodiment of the present technology herein.

In an actual application, the foregoing program modules may be implemented by a central processing unit (CPU), a micro processor unit (MPU), a digital signal processor (DSP), a field programmable gate array (FPGA), or the like.

It should be noted that, when the face image processing terminal provided in this embodiment of the present technology performs face image processing, only divisions of the foregoing program modules are used as an example for description. In an actual application, the foregoing processing may be allocated to and completed by different program modules based on requirements, that is, the internal structure of the apparatus is divided into different program modules, to complete all or some of the foregoing described processing.

Figure 9:
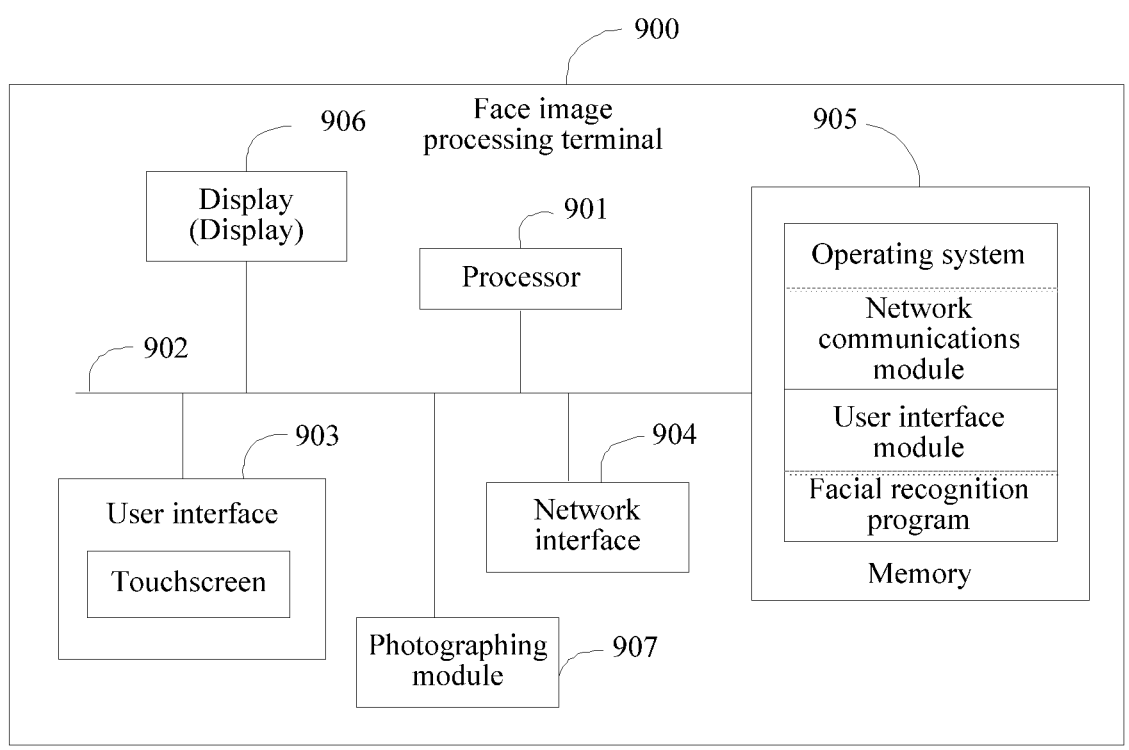
FIG. 9 is a schematic diagram of an optional hardware structure of a face image processing terminal according to an embodiment of the present technology.

The following will describe, with reference to the accompanying drawings, the face image processing terminal that implements the embodiments of the present technology. The face image processing terminal may be implemented by using various forms of terminals, for example, a desktop computer, a notebook computer or a smartphone. The following further describes a hardware structure of the face image processing terminal in the embodiments of the present technology. It may be understood that FIG. 9 shows only an exemplary structure rather than all structures of the face image processing terminal. A part of the structure or the entire structure shown in FIG. 9 may be implemented based on requirements.

Referring to FIG. 9, FIG. 9 is a schematic diagram of an optional hardware structure of a face image processing terminal according to an embodiment of the present technology. In an actual application, the schematic diagram may be applied to the foregoing various terminals running application programs. A face image processing terminal 900 shown in FIG. 9 may include at least one processor 901 such as a CPU, at least one communications bus 902, a user interface 903, at least one network interface 904, a memory 905, a display 906 and a photographing module 907. Various components in the face image processing terminal 900 are coupled together by using the communications bus 902. It may be understood that the communications bus 902 is configured to implement connection and communication between the components. The communications bus 902, besides including a data bus, further includes a power bus, a control bus, and a status signal bus. However, for clear description, various buses are marked as the communications bus 902 in FIG. 9.

The user interface 903 may include a display, a keyboard, a mouse, a track ball, a click wheel, a key, a button, a touch panel, a touchscreen, or the like. The network interface 904 may include a standard wired interface and a standard wireless interface such as a WiFi interface.

It may be understood that the memory 905 may be a high-speed RAM memory, or may be a non-volatile memory, for example, at least one magnetic disk memory. The memory 905 may alternatively be at least one storage system far away from the processor 901. The memory 905 in this embodiment of the present technology is configured to store various types of data to support operation of the face image processing terminal 900. Examples of the data include any computer program used for operating on the face image processing terminal 900, for example, an operating system, a network communications module, a user interface module and a facial recognition program. A program implementing the face image processing method in the embodiments of the present technology may be included in the facial recognition program.

The face image processing method disclosed in the embodiments of the present technology may be applied to the processor 901, or may be implemented by the processor 901. The processor 901 may be an integrated circuit chip and has a signal processing capability. In an implementation process, the steps in the face image processing method may be implemented through a hardware integrated logical circuit in the processor 901, or an instruction in the form of software. The foregoing processor 901 may be a general purpose processor, a DSP, another programmable logic component, a discrete gate, a transistor logic component, a discrete hardware component, or the like. The processor 901 may implement or execute the methods, the steps, and the logical block diagrams provided in the embodiments of the present technology. The general purpose processor may be a microprocessor, any conventional processor, or the like. The steps in the face image processing method provided in the embodiments of the present technology may be directly implemented by a hardware decoding processor, or may be implemented by combining hardware and software modules in a decoding processor. The software module may be located in a storage medium, the storage medium is located in the memory 905, and the processor 901 reads information in the memory 905 and performs the steps of the face image processing method provided in the embodiments of the present technology in combination with hardware of the processor 901.

In an exemplary embodiment, an embodiment of the present technology further provides a storage medium, storing an executable program, the executable program, when executed by a processor, implementing the face image processing method according to the embodiments of the present technology, for example, the face image processing method shown in FIG. 3 or FIG. 4. The storage medium provided in this embodiment of the present technology may be a storage medium such as an optical disc, a flash memory or a magnetic disk, and may optionally be a non-transitory storage medium.

It should be noted that the face image processing terminal 700 or the face image processing terminal 900 in the embodiments of the present technology may include, but is not limited to, an electronic device such as a personal computer, a mobile computer, a tablet computer, a mobile telephone, a PDA, a smart television, a smart swatch, smart glasses, or a smart band. It may be understood that for functions of the modules in the face image processing terminal 700 or the face image processing terminal 900, reference may be made to a specific implementation of any embodiment in FIG. 3 or FIG. 4 in the foregoing method embodiments, and details are not described herein again.

Based on the schematic diagram of the optional application scenario shown in FIG. 2, the face image processing method provided in the embodiments of the present technology may be applied to an application program related to face image recognition, for example, may be applied to all sensitive operations related to the face image recognition in QQ security center, for example, scanning the face to change a password, scanning the face to change a mobile phone or enabling a password with the face. An example in which a terminal is a mobile phone, an application program is an application program of the QQ security center, and a facial recognition operation instruction is an instruction triggered to be generated based on scanning the face to change a password is used below to describe an implementation process of the face image processing method provided in the embodiments of the present technology.

First, a user opens the application program of the QQ security center on the mobile phone, and uses a function of scanning the face to change a password.

Second, the application program of the QQ security center reports hardware and/or software version information of the mobile phone to a daemon server to query a light threshold of the mobile phone, where the light threshold includes a first preset threshold Threshhold_luminance_min and a second preset threshold Threshhold_luminance_max.

The daemon server may allocate, based on the received hardware and/or software version information of the mobile phone, a first preset threshold and a second preset threshold that match the hardware and/or software version information of the mobile phone, and returns the first preset threshold and the second preset threshold to the mobile phone. The hardware version information of the mobile phone may include, but is not limited to, hard information such as a type, a brand, a mainboard or a display recognition chip of the mobile phone; and the software version information of the mobile phone may include, but is not limited to, software information such as an operating system version, an application program that currently requests to perform face image recognition, or version information of the application program.

Third, the application program of the QQ security center collects a face image by turning on a camera of the mobile phone. During collecting of the face image, if it is detected that an operating system of the mobile phone is an Android system, YUV-RGB-HSV color space model conversion is performed on the collected face image, and a corresponding luminance value V is extracted from a value channel of the converted face image. If it is detected that the operating system of the mobile phone is an IOS system, RGB-HSV color space model conversion is performed on the collected face image, and a corresponding luminance value V is extracted from a value channel of the converted face image.

Fourth, when the luminance value V is less than Threshhold_luminance_min, the application program of the QQ security center does not perform face image recognition, but instead actively prompts the user with prompt information such as "Light is excessively dark, please turn on a luminance enhancement mode" shown in FIG. 5 to prompt the user that light luminance of an environment in which the mobile phone is currently located is excessively dark. In addition, luminance of light emitted from a display of the mobile phone is enhanced to a target luminance value, so that the light emitted from the display of the mobile phone is irradiated on the face of the user. If the user clicks on an option button for enhancing luminance, the luminance enhancement mode may be turned on, and all areas on the application program of the QQ security center other than a collection area of the face image change from a translucent white mask layer to a non-transparent white mask layer.

The target luminance value may be highest luminance that can be achieved by the display of the terminal, or may be a luminance compensation value determined based on a difference between the light luminance of the environment in which the mobile phone is located and required environment light luminance, or may be determined based on an empirical value.

Fifth, when the luminance value V is greater than Threshhold_luminance_max, the application program of the QQ security center generates and displays prompt information, and the prompt information is used for prompting to adjust a collection angle and/or area.

Sixth, when the luminance value V of the collected face image falls within [Threshhold_luminance_min,Threshhold_luminance_max], facial recognition is performed based on the collected face image. The user enters an interface for changing a QQ password to perform an operation of changing the password.

In conclusion, the embodiments of the present technology can achieve the following beneficial effects:

(1) The luminance value of the collected face image is calculated; the luminance of the light emitted from the display of the terminal is enhanced to the target luminance value when the luminance value is less than the first preset threshold, and the face image is re-collected and the corresponding luminance value is calculated; and the facial recognition is automatically performed based on the re-collected face image, when the luminance value of the re-collected face image falls within the preset luminance value range, thereby reducing the unqualified face image data sources from the data source and improving the success rate of the facial recognition.

(2) When the luminance value of the collected face image is greater than the second preset threshold, the prompt information indicating that light is excessively bright is generated and displayed, so that when the ambient light is non-ideal, the prompt information can actively guide the user to perform the correct operation (for example, adjusting the collection angle and/or area). By actively reminding the user of the reason for the failure of the face image verification, the usage experience of the user is greatly improved.

(3) When the light is seriously insufficient, the button for enhancing the luminance is generated and displayed to prompt whether the luminance enhancement mode is already turned on, and the mask layer is added in the target area in the display interface of the terminal after the luminance enhancement mode is turned on. Therefore, the success rate of the face image recognition in the completely dark environment can be effectively improved, so that the usage scenarios of the face image recognition are wider.

(4) The highest luminance that can be achieved by the display of the terminal is determined as the target luminance value, and the luminance of the display of the terminal is adjusted to the highest luminance. The luminance of the display of the terminal is enhanced at a time based on the highest luminance. That is, the luminance of the display of the terminal is adjusted to the highest luminance. In this way, the luminance of the display of the terminal does not need to be repeatedly adjusted, and the efficiency of the face image recognition is improved.

(5) The difference between the light luminance of the environment in which the terminal is located and the required environment light luminance is equivalent to the luminance compensation value. In this way, the collected face image satisfies the ideal luminance of the recognition (the required environment light luminance), and accuracy of a recognition result based on the collected face image is ensured.

(6) The product of the difference between the light luminance of the environment in which the terminal is located and the required environment light luminance and the compensation coefficient greater than 1 serves as the luminance compensation value, and the luminance of the display of the terminal is adjusted to the luminance compensation value. In this way, the negative impact of scattering of the light on the compensated light luminance can be effectively avoided.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   at an electronic device having one or more processors, memory, a display, and a camera:
   retrieving a preset brightness range from a remote server, wherein the preset brightness range is dependent upon hardware and/or software version information of the electronic device and the preset brightness range includes a first preset threshold brightness;
   collecting, using the camera, a face image in response to a facial scan instruction;
   calculating a value of a measure of image brightness of the collected face image;
   in accordance with a determination that the value of the measure of image brightness is less than the first preset threshold brightness:
     enhancing luminance of light that is emitted from a display of the electronic device to a target luminance value according to a difference between the value of the measure of image brightness and the first preset threshold brightness;
     re-collecting a face image using the camera while the luminance of light emitted from the display of the electronic device is enhanced to the target luminance value;
     calculating a corresponding value for the measure of image brightness for the re-collected face image; and
     in accordance with a determination that the value of the measure of image brightness of the re-collected face image falls within the preset brightness range, performing facial recognition based on the re-collected face image.

2. The method according to claim 1, further comprising:
   in accordance with a determination that the value of the measure of image brightness of the collected face image is greater than a second preset threshold brightness:
     outputting prompt information to request a user to adjust an external image collection condition of the electronic device; and
     re-collecting a face image after the external image collection condition has been adjusted.

3. The method according to claim 1, wherein the enhancing the luminance of light emitted from the display of the electronic device to the target luminance value comprises:
    determining highest luminance that is achievable by the display of the electronic device; and
    adjusting luminance of the display of the electronic device to the highest luminance of the display.

4. The method according to claim 1, wherein the enhancing the luminance of light emitted from the display of the electronic device to the target luminance value comprises:
    determining, based on a difference between a brightness of an environment in which the electronic device is located and a required environment brightness, a luminance compensation value; and
    increasing luminance of the display of the electronic device in accordance with the luminance compensation value.

5. The method according to claim 1, further comprising:
    displaying, on the display of the electronic device, a user interface control for enhancing luminance of the display, wherein the user interface control visually indicates whether a luminance enhancement mode is currently turned on or turned off.

6. The method according to claim 5, further comprising:
    while the luminance of the light emitted from the display of the electronic device is enhanced to the target luminance value, detecting a user input that activates the user interface control to turn on the luminance enhancement mode; and
    in response to receiving the user input, adding a mask layer in a target area on a currently displayed user interface of the electronic device, wherein the target area comprises an area that is outside a facial portion of the face image currently shown on the display of the electronic device, and wherein an overall brightness of the mask layer is greater than an overall brightness of an area of the face image that is covered by the mask layer.

7. An electronic device, comprising:
    one or more processors;
    a display;
    a camera; and
    memory comprising instructions, which when executed by the one or more processors, cause the processors to perform operations comprising:
        retrieving a preset brightness range from a remote server, wherein the preset brightness range is dependent upon hardware and/or software version information of the electronic device and the preset brightness range includes a first preset threshold brightness;
        collecting, using the camera, a face image in response to a facial scan instruction;
        calculating a value of a measure of image brightness of the collected face image;
        in accordance with a determination that the value of the measure of image brightness is less than the first preset threshold brightness:
            enhancing luminance of light that is emitted from the display of the electronic device to a target luminance value according to a difference between the value of the measure of image brightness and the first preset threshold brightness;
            re-collecting a face image using the camera while the luminance of light emitted from the display of the electronic device is enhanced to the target luminance value;
            calculating a corresponding value for the measure of image brightness for the re-collected face image; and
            in accordance with a determination that the value of the measure of image brightness of the re-collected face image falls within the preset brightness range, performing facial recognition based on the re-collected face image.

8. The electronic device according to claim 7, wherein the operations further comprise:
    in accordance with a determination that the value of the measure of image brightness of the collected face image is greater than a second preset threshold brightness:
        outputting prompt information to request a user to adjust an external image collection condition of the electronic device; and
        re-collecting a face image after the external image collection condition has been adjusted.

9. The electronic device according to claim 7, wherein the enhancing the luminance of light emitted from the display of the electronic device to the target luminance value comprises:
    determining highest luminance that is achievable by the display of the electronic device; and
    adjusting luminance of the display of the electronic device to the highest luminance of the display.

10. The electronic device according to claim 7, wherein the enhancing the luminance of light emitted from the display of the electronic device to the target luminance value comprises:
    determining, based on a difference between a brightness of an environment in which the electronic device is located and a required environment brightness, a luminance compensation value; and
    increasing luminance of the display of the electronic device in accordance with the luminance compensation value.

11. The electronic device according to claim 7, wherein the operations further comprise:
    displaying, on the display of the electronic device, a user interface control for enhancing luminance of the display, wherein the user interface control visually indicates whether a luminance enhancement mode is currently turned on or turned off.

12. The electronic device according to claim 11, wherein the operations further comprise:
    while the luminance of the light emitted from the display of the electronic device is enhanced to the target luminance value, detecting a user input that activates the user interface control to turn on the luminance enhancement mode; and
    in response to receiving the user input, adding a mask layer in a target area on a currently displayed user interface of the electronic device, wherein the target area comprises an area that is outside a facial portion of the face image currently shown on the display of the electronic device, and wherein an overall brightness of the mask layer is greater than an overall brightness of an area of the face image that is covered by the mask layer.

13. A non-transitory computer-readable storage medium storing instructions, the instructions, when executed by one or more processors of an electronic device, cause the processors to perform operations comprising:
    retrieving a preset brightness range from a remote server, wherein the preset brightness range is dependent upon hardware and/or software version information of the electronic device and the preset brightness range includes a first preset threshold brightness;

collecting, using a camera of the electronic device, a face image in response to a facial scan instruction;

calculating a value of a measure of image brightness of the collected face image;

in accordance with a determination that the value of the measure of image brightness is less than the first preset threshold brightness:

enhancing luminance of light that is emitted from the display of the electronic device to a target luminance value according to a difference between the value of the measure of image brightness and the first preset threshold brightness;

re-collecting a face image using the camera while the luminance of light emitted from the display of the electronic device is enhanced to the target luminance value;

calculating a corresponding value for the measure of image brightness for the re-collected face image; and in accordance with a determination that the value of the measure of image brightness of the re-collected face image falls within the preset brightness range, performing facial recognition based on the re-collected face image.

14. The computer-readable storage medium according to claim 13, wherein the operations further comprise:

in accordance with a determination that the value of the measure of image brightness of the collected face image is greater than a second preset threshold brightness:

outputting prompt information to request a user to adjust an external image collection condition of the electronic device; and re-collecting a face image after the external image collection condition has been adjusted.

15. The computer-readable storage medium according to claim 13, wherein the enhancing the luminance of light emitted from the display of the electronic device to the target luminance value comprises:

determining highest luminance that is achievable by the display of the electronic device; and adjusting luminance of the display of the electronic device to the highest luminance of the display.

16. The computer-readable storage medium according to claim 13, wherein the enhancing the luminance of light emitted from the display of the electronic device to the target luminance value comprises:

determining, based on a difference between a brightness of an environment in which the electronic device is located and a required environment brightness, a luminance compensation value; and increasing luminance of the display of the electronic device in accordance with the luminance compensation value.

17. The computer-readable storage medium according to claim 13, wherein the operations further comprise:

displaying, on the display of the electronic device, a user interface control for enhancing luminance of the display, wherein the user interface control visually indicates whether a luminance enhancement mode is currently turned on or turned off;

while the luminance of the light emitted from the display of the electronic device is enhanced to the target luminance value, detecting a user input that activates the user interface control to turn on the luminance enhancement mode; and in response to receiving the user input, adding a mask layer in a target area on a currently displayed user interface of the electronic device, wherein the target area comprises an area that is outside a facial portion of the face image currently shown on the display of the electronic device, and wherein an overall brightness of the mask layer is greater than an overall brightness of an area of the face image that is covered by the mask layer.

\* \* \* \* \*